(12) United States Patent
Scott (10) Patent No.: US 11,063,818 B2
(45) Date of Patent: Jul. 13, 2021

(54) METHOD AND APPARATUS FOR A SOFTWARE DEFINED SATELLITE AND NETWORK

(71) Applicant: The Boeing Company, Chicago, IL (US)

(72) Inventor: James P. Scott, El Segundo, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/418,053

(22) Filed: May 21, 2019

(65) Prior Publication Data

US 2020/0374186 A1    Nov. 26, 2020

(51) Int. Cl.
| | |
|---|---|
| H04L 12/24 | (2006.01) |
| H04L 12/911 | (2013.01) |
| H04B 7/185 | (2006.01) |
| G06F 9/455 | (2018.01) |
| H04L 29/08 | (2006.01) |
| H04W 4/40 | (2018.01) |

(52) U.S. Cl.
CPC ...... *H04L 41/0803* (2013.01); *G06F 9/45558* (2013.01); *H04B 7/185* (2013.01); *H04L 47/82* (2013.01); *G06F 2009/45595* (2013.01); *H04L 41/08* (2013.01); *H04L 67/12* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 2015/0270897 A1* | 9/2015 | Sackman | H04J 14/022 398/125 |
| 2018/0020440 A1* | 1/2018 | Stuck | H04W 40/06 |
| 2018/0359670 A1* | 12/2018 | Fang | H04W 36/385 |

* cited by examiner

*Primary Examiner* — James A Edwards
(74) *Attorney, Agent, or Firm* — Sage Patent Group (57) ABSTRACT

A software defined network including a constellation of software defined satellites. Each software defined satellite includes computing resources that are dynamically configurable to provide at least one of a plurality of different types of services. Each software defined satellite further includes an interface that interfaces with a software defined network ground station.

20 Claims, 8 Drawing Sheets

METHOD AND APPARATUS FOR A SOFTWARE DEFINED SATELLITE AND NETWORK

FIELD

The present disclosure relates generally to spacecraft, and in particular to software defined satellites and networks.

BACKGROUND

A wide range of important functions are implemented on satellites, including communications, imaging (visible, infra-red, radar, etc.), and sensor processing (e.g., detecting and processing x-rays, gamma rays, and the like). Satellites provide numerous inherent advantages for performing these functions. For Earth-facing applications, such as communications, imaging, weather monitoring, and the like, satellites have an extremely large field of view, and can focus cameras or radio frequency (RF) beams to specific locations of interest. For Space-facing applications, such as astronomy and physics, satellites offer a sensor platform unencumbered by atmospheric attenuation and interference.

Drawbacks of a satellite as a platform for implementing these functions include the need for radiation-hardened circuitry, strict weight and power budgets, the very high cost of launch and operation, and the near-impossibility of upgrade or repair to the payload once placed in orbit. A satellite payload must hence be carefully designed, including sufficient computational, storage, and communications capabilities to carry out its mission over its targeted lifetime. In rapidly evolving fields, such as telecommunications and image processing, a specific technology must be chosen and "locked in" for the life of the satellite—raising the distinct possibility of the satellite becoming at least partially obsolete shortly after launch, as the relevant technology continues to evolve and advance.

Figure 1:
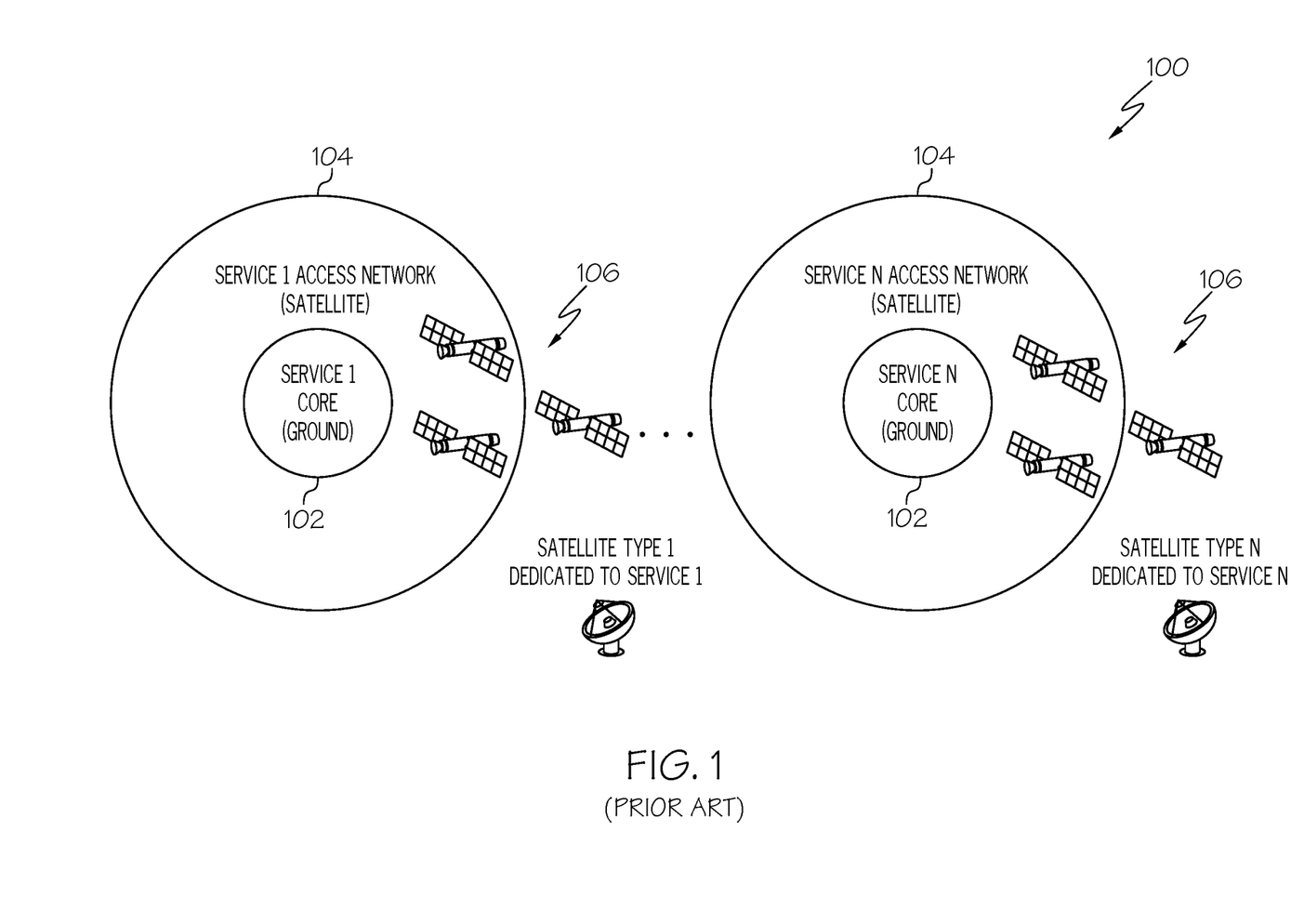
FIG. 1 is a diagram depicting a conventional satellite-based telecommunication network.

Additionally, conventional satellites are dedicated, not only to one function (e.g., imaging, communications), but to service type, or even one "generation" within a service type, implementing that function. FIG. 1 depicts this situation as it applies to communication satellites. FIG. 1 is a diagram of an example of a conventional satellite-based telecommunications network 100. The telecommunication network 100 includes a core network 102 portion and an access network 104 portion. In a satellite context, a constellation of satellites 106 are dedicated to implementing the access network 104 (or at least the air interface portion thereof) of a particular core network 102. The satellites 106 are dedicated to implementing this one functionality. For example, to implement a 3GPP Long Term Evolution (LTE) network, the evolved packet core would be implemented in ground-based network nodes, with a plurality of satellites 106 each implementing an LTE base station, or eNodeB (or the air interface portion of an eNodeB). Generally, each of these satellites 106 would have an identical payload, and that payload would be dedicated to implementing eNodeB functionality. As the state of the art evolves, say to fifth generation or 5G networking standards, a new constellation of satellites, dedicated to implementing the 5G access network, known as New Radio (NR), must be launched.

Virtualization is a known computer operating technique whereby hypervisor software executing on processing circuitry (referred to as the host machine) creates a virtual computing platform (called the guest machine), on which other software can execute. From the perspective of this software, the guest machine is indistinguishable from an actual processing environment. Virtualization was originally developed to run multiple, independent programs on mainframe computers. The technology has found renewed popularity, and its sophistication has dramatically increased, as centralized computing resources (e.g., compute and memory servers) are made available to many independent tasks in the so-called cloud computing environment.

A trend in modern telecommunications and other signal processing applications is migration of signal processing functions from dedicated hardware to software executing on Digital Signal Processors (DSP). For example, a software defined radio (SDR) is a system where functions traditionally performed by analog RF hardware—such as amplifiers, mixers, filters, modulators/demodulators, and the like—are implemented in software executing on a DSP. SDRs present numerous advantages over conventional, hardware-based radios. They can easily be modified to operate in different frequency bands, or to utilize different modulation and coding techniques. Many of the conventional problems of co-locating RF components and computational circuits on a single board or within a single chip are eliminated. The risk of obsolesce is virtually eliminated, as the software can be updated to comply with the latest standards and protocols. Perhaps the greatest advantage to an SDR—particularly one deployed in an inaccessible location—is that its functionality can be altered remotely.

The Background section of this document is provided to place aspects of the present disclosure in technological and operational context, to assist those of skill in the art in understanding their scope and utility. Approaches described in the Background section could be pursued but are not necessarily approaches that have been previously conceived or pursued. Unless explicitly identified as such, no statement herein is admitted to be prior art merely by its inclusion in the Background section.

SUMMARY

In accordance with an embodiment, a software defined network includes a constellation of software defined satellites. Each software defined satellite includes computing resources that are dynamically configurable to provide at least one of a plurality of different types of services. Each software defined satellite also includes an interface that interfaces with a software defined network ground station.

In accordance with another embodiment, a software defined satellite includes computing resources that are dynamically configurable to provide at least one of a plurality of different types of services in response to configuration information from a software defined network (SDN) controller. The software defined satellite also includes a phase array antenna that transmits and receives radio frequency (RF) signals from user equipment and a software defined network (SDN) ground station. The SDN ground station includes the SDN controller.

In accordance with another embodiment, a software defined network (SDN) ground station includes a system resource manager configured to control and manage implementation of a plurality of different types of services across a constellation of software defined satellites. The SDN ground station also includes a software defined network (SDN) controller configured to control and manage dynamic configuration of computing resources on each software defined satellite.

In accordance with a further embodiment, a method of providing satellite-based services includes providing a constellation of software defined satellites. Each software defined satellite includes computing resources that are dynamically configurable to provide at least one of a plurality of different types of services. The method also includes providing a software defined network (SDN) ground station that interfaces with the software defined satellites.

In accordance with an embodiment and any of the preceding embodiments, the plurality of different types of services include communications, imaging, sensor processing, space-based RADAR, and environmental monitoring. The communications include telecommunications, Internet-of-Things (IoT), Vehicle-to-Vehicle or Vehicle-to-Infrastructure (V2X) communications.

In accordance with an embodiment and any of the preceding embodiments, the computing resources include virtualized hardware to provide one or more virtual machines (VMs) or containers, one or more virtual digital signal processors (vDSPs), and one or more virtual baseband units (vBBUs), wherein the VMs or containers, vDPSs and vBBUs are dynamically configured to provide the at least one of the plurality of different types of services.

In accordance with an embodiment and any of the preceding embodiments, one of the VMs or containers functions as a configuration control computer to configure the computing resources into the VMs or containers, vDSPs, and vBBUs, and to allocate a service overlay to each, in response to configuration information received from a ground-based software defined network (SDN) controller.

In accordance with an embodiment and any of the preceding embodiments, the one or more VMs or containers are configured to implement one or more core network nodes and the one or more vDSPs and vBBUs are configured to implement corresponding access network nodes.

In accordance with an embodiment and any of the preceding embodiments, the vDSPs are configured to process RF waveforms and perform additional functions including anti-jamming and nulling, interference cancellation, and cognitive radio algorithms, and the vBBUs are configured to implement modem functions.

In accordance with an embodiment and any of the preceding embodiments, the configuration control computer, in response to the configuration information received from the SDN controller, is adapted to dynamically configure two or more core network service types and corresponding access network service types on the software defined satellites.

In accordance with an embodiment and any of the preceding embodiments, the configuration control computer, in response to configuration information received from the SDN controller, is adapted to dynamically reconfigure at least one of the core network nodes and the access network nodes on the software defined satellites to implement a different network service type.

In accordance with an embodiment and any of the preceding embodiments, the configuration control computer, in response to configuration information received from the SDN controller, is adapted to dynamically reconfigure parameters of one or more core network nodes and access network nodes on one or more software defined satellites.

In accordance with an embodiment and any of the preceding embodiments, the software defined network ground station includes a system resource manager configured to control and manage implementation of the plurality of different types of services across the constellation of software defined satellites. The software defined network ground station also includes a software defined network (SDN) controller configured to control and manage the dynamic configuration of the computing resources on each software defined satellite.

The features, functions, and advantages that have been discussed can be achieved independently in various embodiments or may be combined in yet other embodiments further details of which can be seen with reference to the following description and drawings.

DETAILED DESCRIPTION

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

According to aspects of the present disclosure, a Software Defined Satellite (SDS) satellite includes virtualized computing resources that allow the implementation of a diversity of virtual machines, which can be utilized to implement a variety of functions conventionally performed largely or wholly in dedicated hardware. These include, for example, telecommunications, imaging, and sensor processing functions. For simplicity of explanation, aspects of the present disclosure are described herein in the context of implementing a telecommunication network using one or more SDSs. However, the disclosure is not limited to this application.

Figure 2:
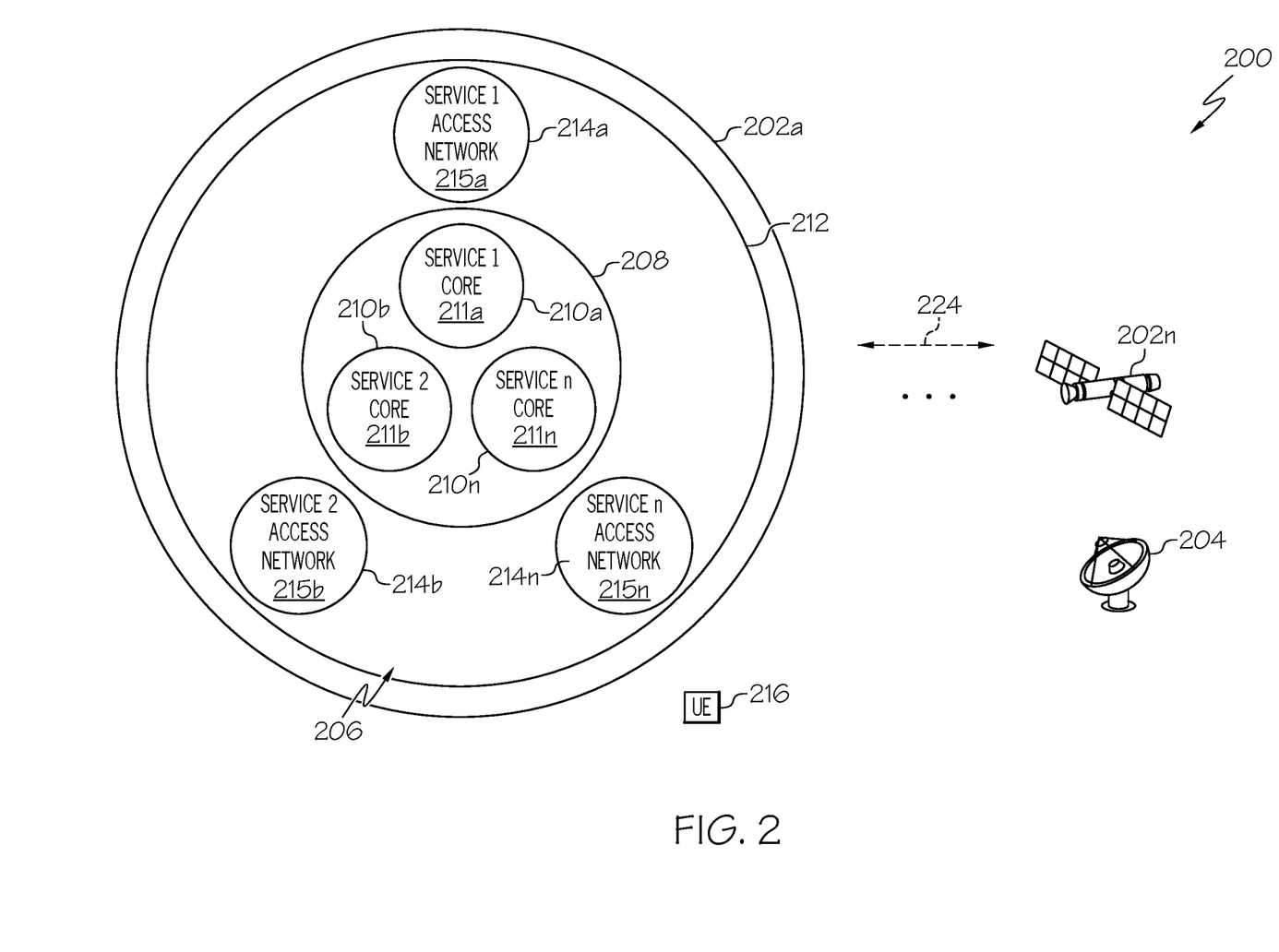
FIG. 2 is an illustration of an example of a Software Defined Network (SDN) in accordance with an embodiment of the present disclosure.

FIG. 2 is an illustration of an example of a Software Defined Network (SDN) 200 in accordance with an embodiment of the present disclosure. The SDN 200 includes a constellation of satellites 202a-202n and one or more Software Defined Network (SDN) Ground Stations 204. The constellation of satellites 202a-202n includes one or more Software Defined Satellites 202a-202n. FIG. 2 is an example of how a Software Defined Satellite (SDS) 202 of the SDN 200 is configurable to selectively provide one of a plurality of different types of services 206. In the example in FIG. 2, the different types of services 206 are described as different types of communications services 206. Examples of different types of communications services 206 include but are not necessarily limited to telecommunications, Internet-of-Things (IoT), vehicle-to-vehicle communications, vehicle-to-infrastructure (V2X) communications, etc. However, in addition to different types of communications services 206, examples of the different types of services 206 that the SDS 202 is reconfigurable to provide include, but are not necessarily limited to, imaging, weather monitoring, astronomical sensing, sensor processing, space-based RADAR, environmental monitoring etc. FIG. 2 depicts a change in paradigm that the SDS 202 enables over the satellite-based telecommunications networks 100 illustrated in FIG. 1. The SDS 202 is not limited to implementing one type of service. The SDS 202 is configurable to implement a multi-service core 208 that includes core network nodes 210a-210n that each embody disparate network types (e.g., cellular, Wi-Fi, Digital Video Broadcast over Satellite, Satellite Audio, etc.). Additionally, the core network nodes 210a-210n are configurable to implement multiple generations of network service types 211a-211n (e.g., 3G, 4G, 5G, etc.). Correspondingly, each SDS 202 is configurable to implement a multi-service access network 212 including a plurality of disparate access networks nodes 214a-214n (e.g., NodeB, eNodeB, gNodeB) that are configurable to implement different access network service types 215a-215n on the SDSs 202. Furthermore, the mix of nodes 210a-210n and 214a-214n is not fixed. SDS 202 is reconfigurable at any time to provide different network service types 211a-211n and 215a-215n based on the configuration of nodes 210a-210n and 214a-214n. This allows the SDN 200 to evolve as user equipment (UE) 216 of a newer generation proliferate, or to serve different geographic areas where different standards or generations dominate. The SDS 202 being configurable also allows the SDN 200 to adapt to conform to different service demands of users operating in the same geographical area (e.g. commercial cellular service subscribers and tactical Department of Defense user communities).

Additionally, by including both the core network nodes 210a-210n and the access network nodes 214a-214n in the SDS 202, signaling overhead is reduced over air interfaces where bandwidth is a scarce resource. Rather, the signaling occurs onboard the SDS 202, through configurable switches interconnecting the virtualized hardware as described in more detail with reference to FIGS. 4 and 6. This allows for greater data rates, reduces latency, and conserves power, compared to transmitting this signaling between satellites and the SDN ground station 204, as is common in conventional communication configurations, such as the satellite-based telecommunications network 100 depicted in FIG. 1, where only the access network 104, or part of the access network 104, is implemented in the satellites 106.

Another significant advantage to the virtualized approach described herein is the ability to dynamically reconfigure one or more nodes 210a-210n and 214a-214n. This means the SDN 200 can be dynamically altered, in near-real-time, such as to counter interference or jamming, or to dynamically adapt to contested spectrum (e.g., for unlicensed spectrum)—a technique known in the art as cognitive radio.

Figure 3:
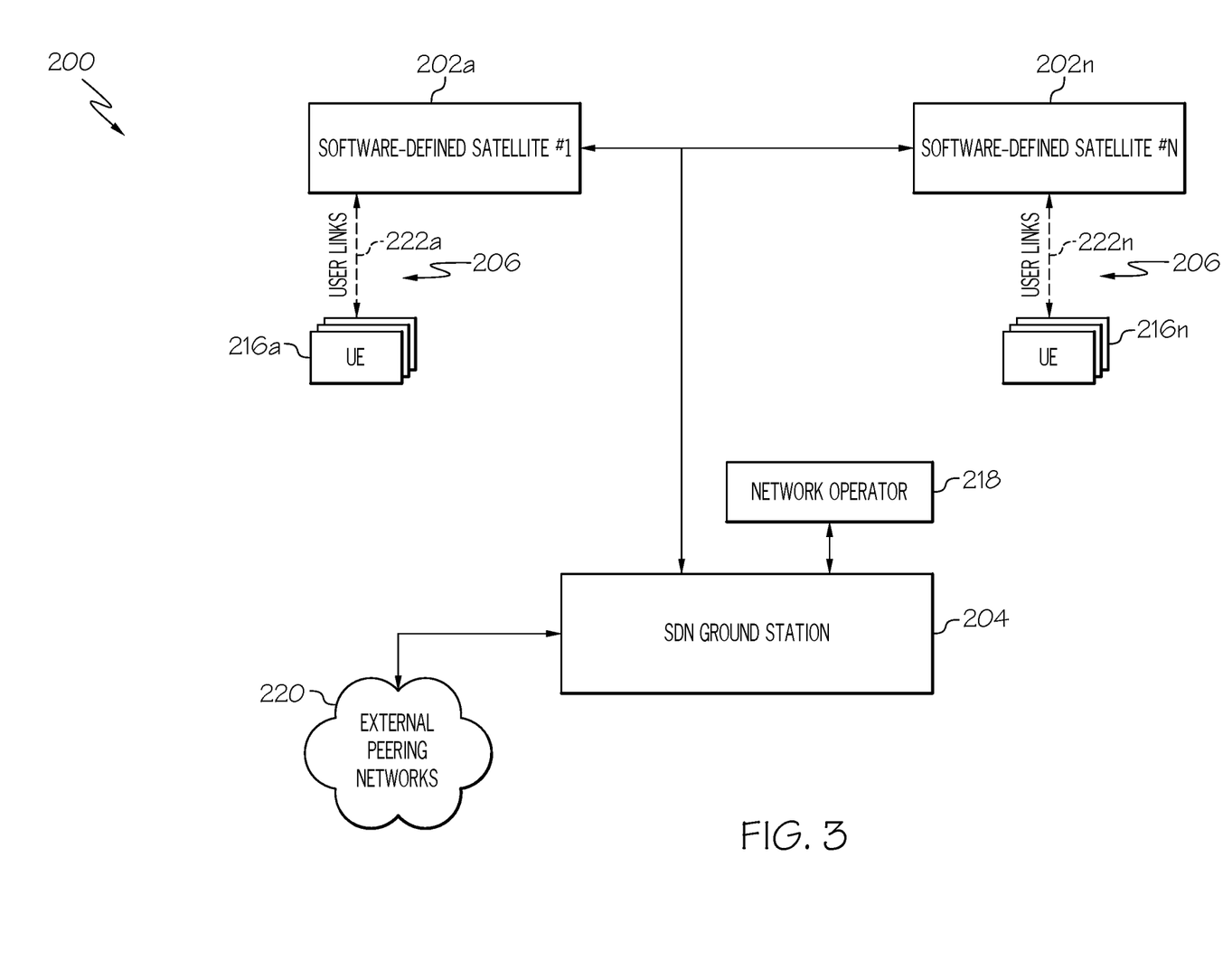
FIG. 3 depicts a Software Defined Satellite (SDS)-based telecommunication SDN according to aspects of the present disclosure.

FIG. 3 depicts an SDS-based, telecommunication Software-Defined Network (SDN) 200 according to aspects of the present disclosure. The SDN 200 includes one or more SDSs 202a-202n, each providing telecommunication services 206 to a plurality of User Equipment (UE) 216a-216n. The SDSs 202a-202n are coordinated and controlled by an SDN Ground Station 204, which is controlled by one or more Network Operators 218. As depicted, the SDN Ground Station 204 can connect to one or more External Peering Networks 220, such as the Internet, a terrestrial Public Land Mobile Network (PLMN), a secure (e.g., military) network, or the like. The UE 216a-216n access the SDSs 202a-202n using user links 222a-222n. Each of the user links 222a-222n are one of an RF link or an optical link, for example, a laser link.

Figure 7:
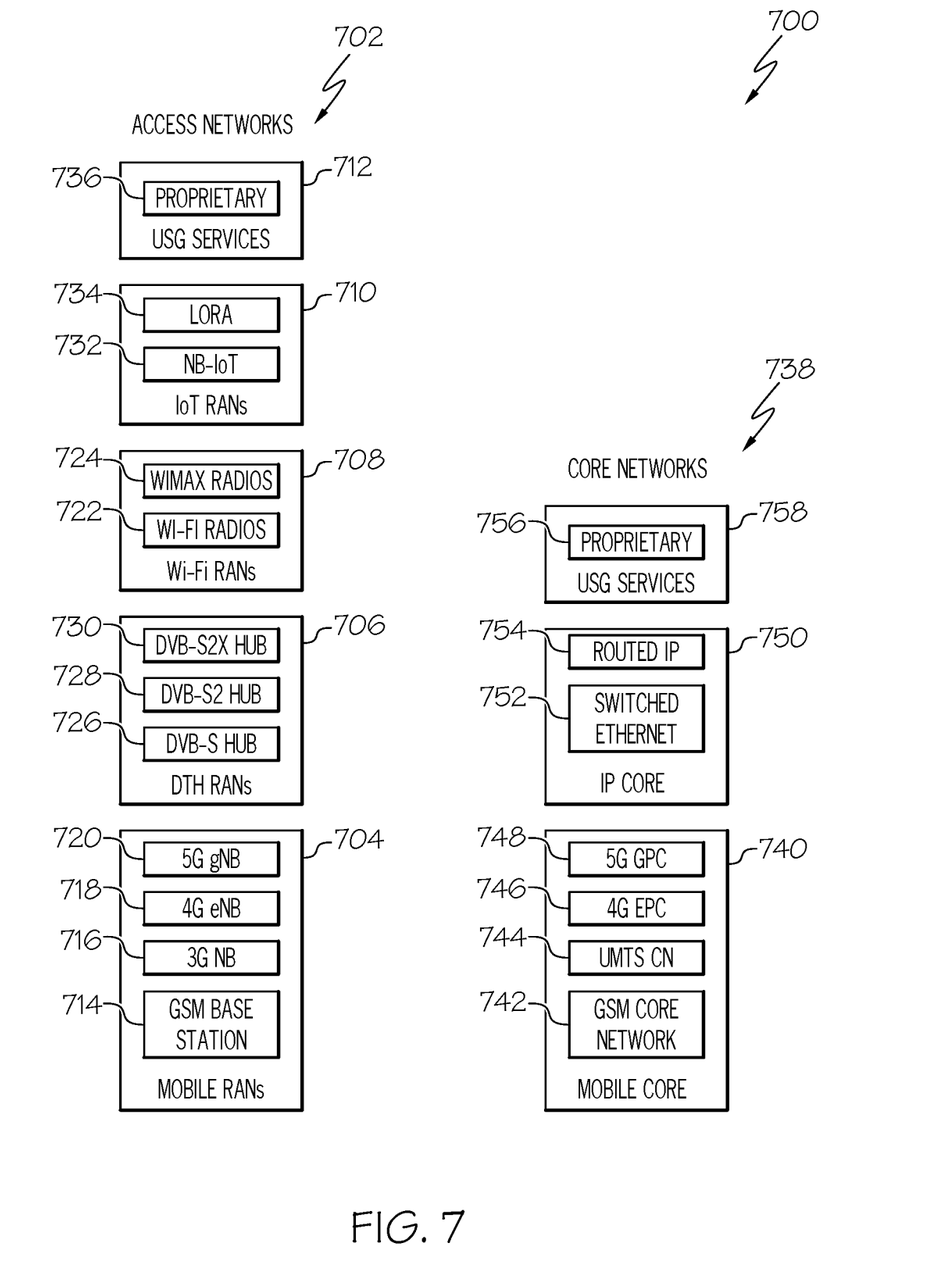
FIG. 7 depicts examples of Service Overlays for representative access networks and core networks that can be implemented using the network architecture of FIG. 3.

In various implementations, the SDN 200 can support a variety of services 206. For example, the UE 216 can include home-based satellite receivers, and the SDN 200 can stream video services direct to consumers' homes, known as Direct-To-Home (DTH). In other examples, the SDN 200 can provide cellular mobile communications services 206, according to any of a number of protocols (e.g., 2G, 3G, 4G, 5G, etc.); wide area networking services (e.g., Wi-Fi, WiMAX, etc.); machine-to-machine (M2M) communications services 206 (e.g., Internet of Things, Long Range WAN or LoRa); and various proprietary communication services 206, such as U.S. Government Services. FIG. 7 depicts examples of representative service overlays 700 that can be utilized by SDN 200. In all cases, the figures and discussion herein are exemplary only, and should not be considered limiting.

Figure 4:
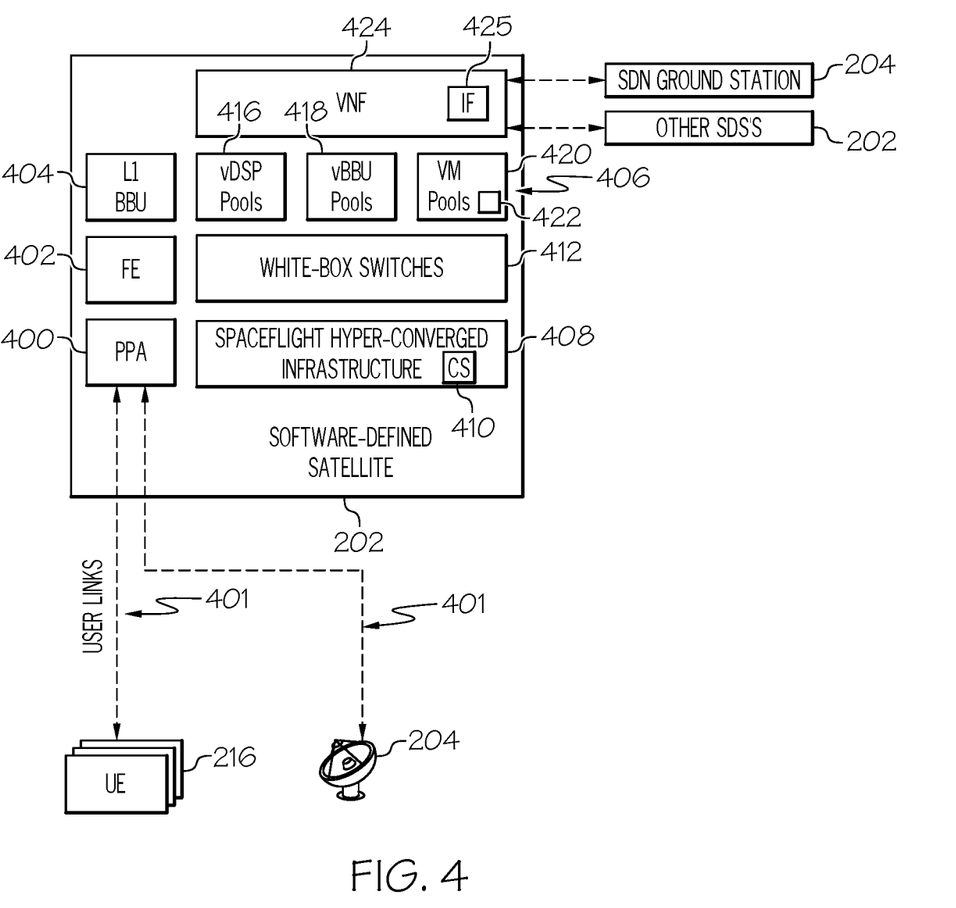
FIG. 4 is a block schematic diagram of an example of a Software Defined Satellite (SDS) operative in an SDN in accordance with an embodiment of the present disclosure.

FIG. 4 is a block schematic diagram of an example of an SDS 202 operative in the SDN 200 in accordance with an embodiment of the present disclosure. A Phased Array Antenna (PAA) 400 transmits and receives Radio Frequency (RF) signals 401 to and from various UE 216 and ground stations 204. These signals 401 are processed by a radio Front End (FE) 402. In accordance with an example, the FE 402 includes analog circuits such as low noise amplifiers, power amplifiers, up/down frequency conversion circuitry, analog/digital conversion circuitry, etc. A Layer 1 (L1) Baseband Unit (BBU) 404 provides computational resources to implement many signal processing functions in software, such as modulation/demodulation, coding/decoding, interleaving/deinterleaving, encryption/decryption, and the like. In various aspects, some or all of these functions are implemented in dedicated hardware. In other aspects, some or all of these functions are implemented in virtual hardware, created by virtualization software executing on onboard computing resources 406.

A Spaceflight Hyperconverged Infrastructure 408 is a cloud-based operating system (host OS) executing on a collection of space-mitigated computing resources (CS) 410. Examples of the computing resources include but are not necessarily limited to computer processing circuitry, memory, and switching circuitry, on which virtualization software runs to create a plurality of virtual machines to implement core network node 210a-210n functionality and access network node 214a-214n functionality (FIG. 2). White-Box Switches 412 implement Ethernet switching in software. The virtualization software creates pools, of virtual computing resources 406, including virtual Digital Signal Processors (vDSPs) 416, virtual Baseband Units (vBBUs) 418 and virtual machines (VMs) 420 or containers. The essential difference between VMs 420 and containers is that VMs 420 require a separate kernel instance or guest operating system which run on a host operating system, while containers can execute on the same host operating system. The vDSPs 416 and vBBUs 418 may be implemented using general purpose computing cores or may employ special purpose DSP acceleration hardware in much the same way a typical computer may employ a Graphics Processing Unit (GPU) for acceleration of display-related functions. The vDSPs 416 are dynamically reassigned to user sessions to provide digital signal processing functions using one of Physical layer (PHY) or Media Access Control layer (MAC) Radio Access Network (RAN) processing. The vBBUs 418 are dynamically reassigned to user sessions to provide MAC, Radio Link Control (RLC), Packet Data Convergence Protocol (PDCP), and Radio Resource Control (RRC) processing. The VMs 420 are dynamically reassigned to user sessions to provide processing of network layer, transport layer and application layer functions. In one exemplary implementation, core network nodes 210a-210n (FIG. 2) are implemented in VMs 420.

Access network nodes 214a-214n (FIG. 2) perform multiple functions, which can be classified into waveform manipulation and baseband processing. The vDSPs 416 are configured to perform waveform manipulation. Example of waveform manipulation include but are not necessarily limited to frequency conversion (mixing), modulation and demodulation, multiple-antenna processing such as Multiple-Input/Multiple-Output (MIMO) combining, filtering, etc. The vBBUs 418 are configured to perform baseband processing. The baseband processing includes modem functions, such as encoding and decoding, encryption and decryption, error detection and signaling, and the like. In one aspect, the L1 BBU 404 is one instance of a vBBU 418. In one exemplary implementation, access network nodes 214a-214n (FIG. 2) are implemented in vDSPs 416 and vBBUs 418.

In one aspect, a VM 420 or container is dedicated to communication with the SDN Ground Station 204 (FIGS. 2 and 3). In particular, this VM 420 or container is configured as a configuration control computer 422, which receives configuration information 504 from an SDN Controller 502 (FIG. 5) in the SDN Ground Station 204. In accordance with an embodiment, the SDN controller 502 is configured to control and manage dynamic configuration of computing resources 406 on each SDS 202a-202n. In response to the configuration information 504, the VM 420 or container configured as a configuration control computer 422 configures the onboard computing resources 406 into vDSPs 416, vBBUs 418, VMs 420, and White-Box Switches 412. The configuration information 504 launches software to execute on the VMs 420 or containers, establishes network routing and forwarding tables for communications, and otherwise manages the implementation of service overlays 700 (e.g., those depicted in FIG. 7) in the SDS 202. In accordance with an example, the configuration control computer 422, in response to commands received from the SDN Controller 502, is adapted to configure two or more core network service types 211a-211n and corresponding access network service types 215a-215n on the SDSs 202. In accordance with another example, the configuration control computer 422, in response to commands received from the SDN Controller 502, is also adapted to dynamically reconfigure at least one of the core network nodes 210a-210n and the access network nodes 214a-214n on the SDSs 202 to implement a different network service type 211a-211n and 215a-215n. In accordance with a further example, the configuration control computer 422, in response to commands received from the SDN Controller 502, is further adapted to dynamically reconfigure parameters of at least one of the core network nodes 210a-210n and the access network nodes 214a-214n on one or more SDSs 202.

Figure 5:
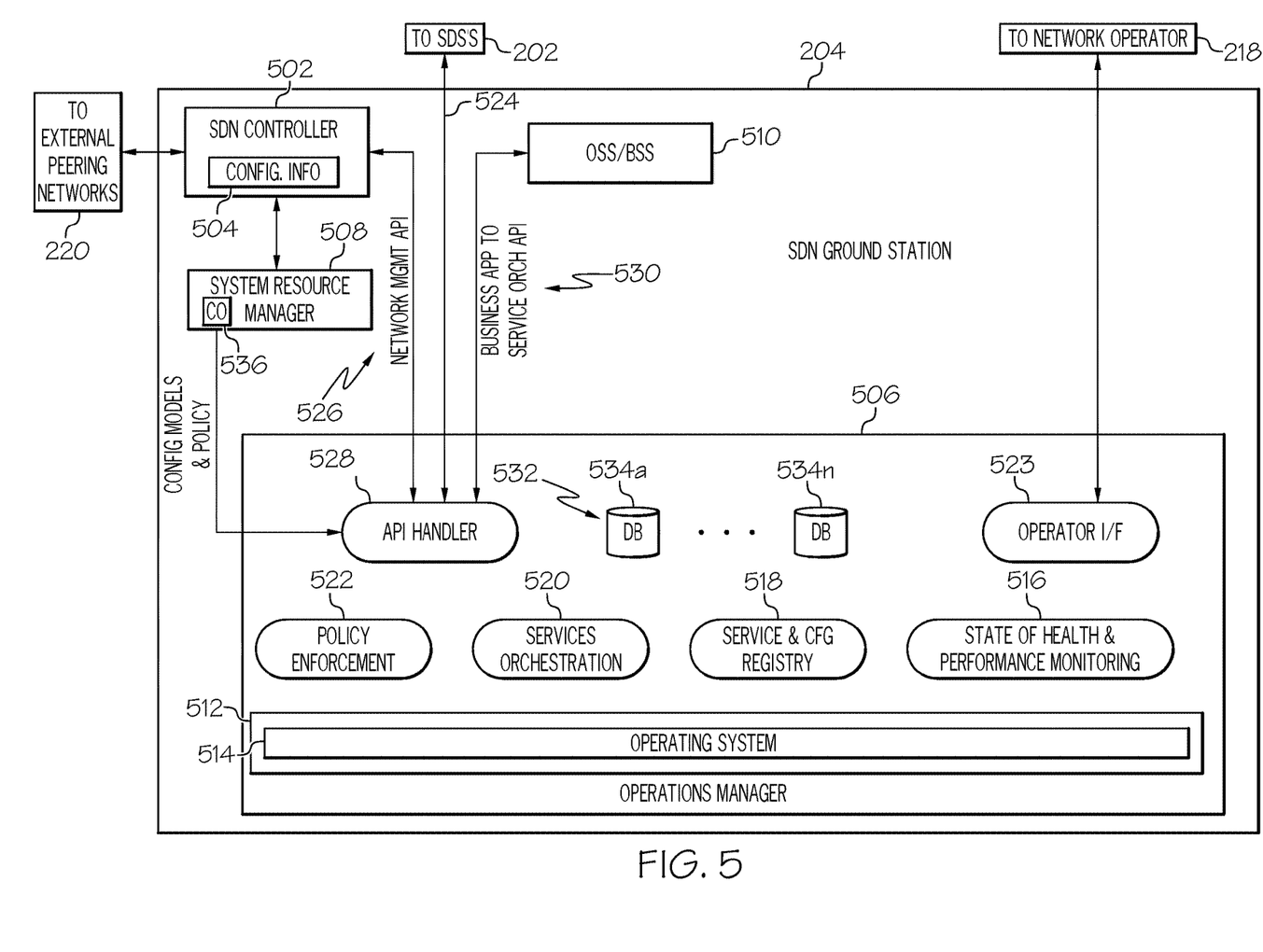
FIG. 5 is a block diagram of an example of an SDN Ground Station in accordance with an embodiment of the present disclosure.

The SDS 202 also includes a Virtual Network Function manager (VNF) 424. The VNF 424 defines an interface 425 that interfaces with the SDN ground station 204. In accordance with an embodiment, the VNF 424 receives configuration information 504 from the SDN Controller 502. The VNF 424 also transmits state of health/performance monitoring information to a Network Management Application Program Interface (API) 526 in the SDN ground station 204 (FIG. 5). The components of the exemplary SDS 202 described above are referred to as the satellite payload 426.

FIG. 5 is a block diagram of an example of an SDN Ground Station 204 in accordance with an embodiment of the present disclosure. The SDN Ground Station 204 includes an Operations Manager 506, System Resource Manager 508, SDN Controller 502, and Operation Support System/Business Support System (OSS/BSS) controller 510. The Operations Manager 506 includes one or more computational resources 512 executing an operating system 514, such as LINUX, to support a plurality of software modules and applications. Examples of the software modules and applications include but are not necessarily limited to a module 516 to monitor the state of health and performance of the SDN 200; a service and configuration registry module 518; a services orchestration module 520; and a policy enforcement module 522. An operator interface 523 accepts control inputs from a network operator 218 (FIG. 3). The operator interface 523 provides the network operator 218 situational awareness command and control station and display.

State of Health (SoH) and Performance Monitoring (PM) module 516 performs the Operations Manager 506 function responsible for fault detection, fault isolation, and fault recovery for the SDN 200. The service and configuration registry module 518 performs the Operations Manager 506 function responsible for service discovery, service registration, and monitoring of health and status of all registered services 206 (FIG. 2). The services orchestration module 520 performs the Operations Manager 506 function used to form processing chains to create services 206 within the SDN 200, within and across the SDSs 202a-202n. For example, an orchestrated service 206 may involve configuration related to PAA 400, FE 402, vDSP 416, vBBU 418, VM 420, and white-box switches 412 at an ingress SDS 202 and egress SDS 202 payload, and multiple inter-satellite links (ISL) 224 (FIG. 2) at one or more intermediate SDS 202 payloads. The ISLs 224 are implemented as RF ISLs or Optical ISLs.

The policy enforcement module 522 performs the Operations Manager 506 function that allows the network operator 218 to input constraints on system performance and user performance (based on Service Level Agreements), resulting in the policy being enforced by the various policy enforcements points within the system (e.g. System Resource Manager 508 admission control algorithms, virtual router traffic policing and traffic shaping on the SDS 202 payloads).

The Operations Manger 506 also includes an Application Programming Interface (API) handler 528. The API handler 528 is the interface between the System Resource Manager 508 and the VNF 424 (FIG. 4) onboard the SDS 202. The API handler 528 is used to provide payload configuration information 504 from the System Resource Manager 508 to the VNF 424 and to provide aggregated Key Performance Indicators (KPI) of the SDS 202 from the VNF 424 to System Resource Manager 508. The VNF 424 also provides real-time SDS 202 state-of-health and performance monitoring information from the VNF 424 to the state of health and performance monitoring module 516.

The Operations Manager 506 additionally includes a database infrastructure 532 that includes a plurality of databases 534a-534n. The database infrastructure 532 is used to provide a persistent memory store to the various functions hosted by the Operations Manager 506.

The System Resource Manager 508 controls and manages the overall SDN 200 (FIG. 2), which is typically implemented across a plurality of SDSs 202a-202n. The System Resource Manager 508 is configured to control and manage implementation of the plurality of different types of services 206 across the constellation of SDSs 202a-202n. In accordance with an example, the System Resource Manager 508 is a distributed system controller responsible for receiving constellation geometry information, a traffic model, user geolocation and user Service Level Agreements from the network operator 218. The System Resource Manager 508 receives real-time updates from the SDSs 202 in the form of aggregate Key Performance Indicators (KPI) in a closed-loop feedback pattern. The system Resource Manager 508 additionally receives user mobility trigger information and produces configuration objects (COs) 536 for each SDS 202 under the purview of the distributed System Resource Manager 508 instance. Examples of the configuration objects 536 include beam laydown, beamforming parameters, per-beam MODEM channel configurations, network routing information and network signaling information. For example, the System Resource Manager 508 decides which core network nodes 210a-210n and access network nodes 214a-214n (FIG. 2) to deploy and the parameters of each (e.g., frequency bands, data rates, supported services, etc.). The System Resource Manager 508 also controls the dynamic reconfiguration of one or more network nodes 210a-210n and 214a-214n in response to interference, jamming, etc. The System Resource Manager 508 further implements and enforces system policies. In accordance with an embodiment, one or more VMs 420 or containers are configured to implement one or more core network nodes 210a-210n and one or more vDSPs 416 and vBBUs 418 are configured to implement corresponding access network nodes 215a-215n.

In response to the System Resource Manager 508, the SDN Controller 502 manages the configuration and implementation of service overlays 700 on each SDS 202. The SDN Controller 502 communicates configuration information 504 to the configuration control computer 422 (FIG. 4) on each SDS 202. Control signaling 524 between the SDN Controller 502 and SDSs 202 is through a Network Management Application Programming Interface (API) 526. In the example in FIG. 5, the Network Management API 526 is implemented by an API Handler 528. In accordance with an example, the SDN Controller 502 is a software function used to manage the L2 switching topology or network layer routing topology of the white-box switches 412 (FIG. 4) hosted on the SDS 202. The SDN Controller 502 also manages the network layer topology of the SDN 200, as defined by Network Path Manager and Network Signaling Manager functions hosted by the System Resource Manager 508.

The OSS/BSS application 510 communicates with the System Resource Manager 508 via a Business Application to Service Orchestration API 530, which is also implemented by the API Handler 528. The OSS/BSS application 510 is responsible for functions such as for example billing and charging, inventory management, operations and maintenance. The OSS/BSS application 510 is also responsible for managing the lower layer Operations Manager 506 functions.

Figure 6:
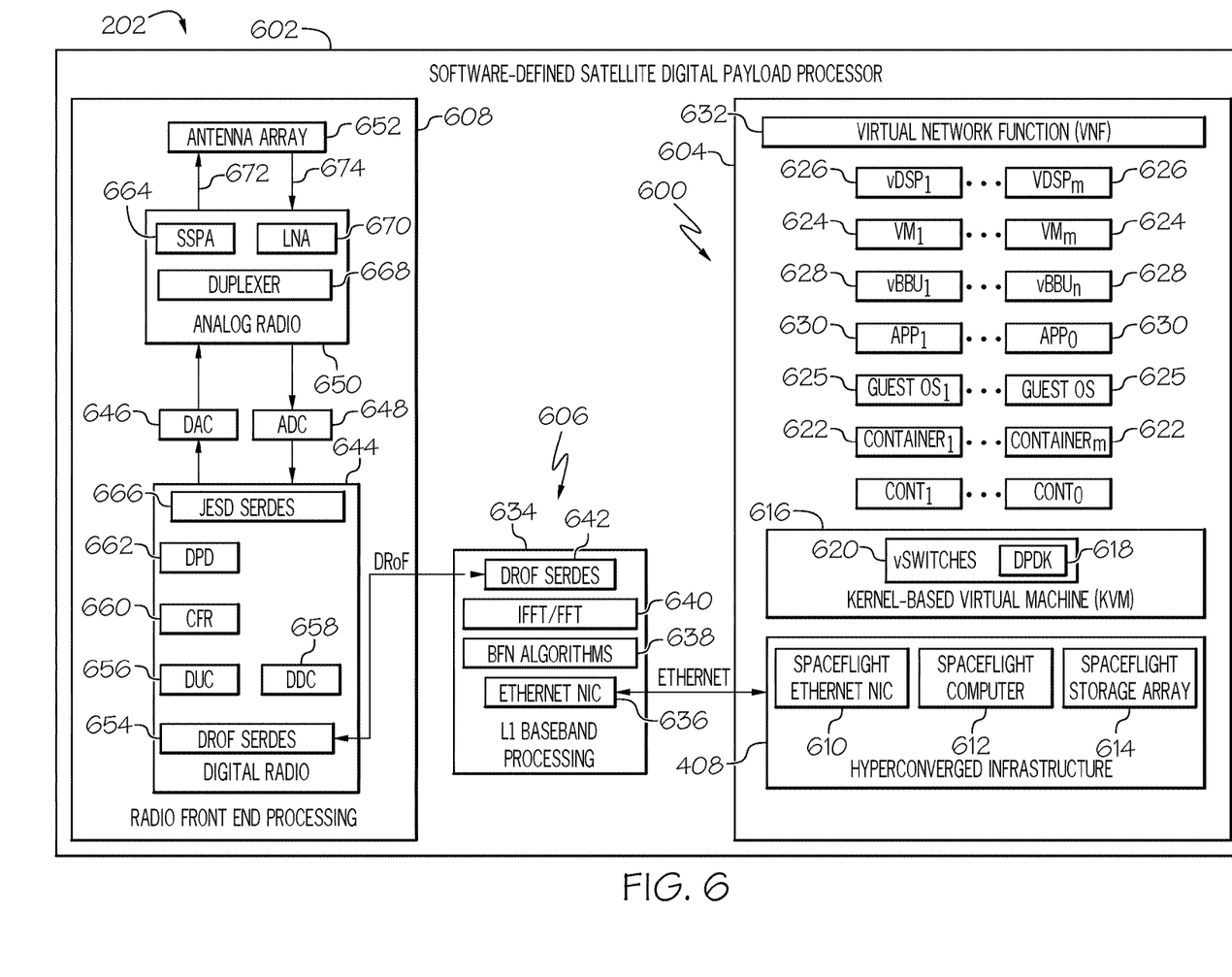
FIG. 6 is a block schematic diagram of an exemplary configuration of telecommunication functions executed on virtualized hardware of one or more Digital Payload Processors of a Software Defined Satellite in accordance with an embodiment of the present disclosure.

FIG. 6 is a block schematic diagram of an exemplary configuration 600 of telecommunication functions executed on virtualized hardware of one or more Digital Payload Processors 602 of an SDS 202 in accordance with an embodiment of the present disclosure. The functions can be classified into Virtualized RAN and Core Processing 604, L1 Baseband Processing 606, and Radio Front End Processing 608.

The Virtualized RAN and Core Processing 604 includes functionality required for operation of the SDS 202, including a Spaceflight Ethernet Network Interface Card (NIC) 610, a Spaceflight Computer 612, and a Spaceflight Storage Array 614. The Spaceflight Ethernet NIC 610, Spaceflight computer 612 and Spaceflight Storage Array 614 are included in the hyperconverged infrastructure 408 previously described with reference to FIG. 4. The Virtualized RAN and Core Processing 604 also includes a Kernel-Based virtual Machine (KVM) 616 which implements a Data Plane Development Kit (DPDK) 618 to provide high-performance packet processing libraries and user space drivers. The DPDK 618 is integrated with a virtual switch (vSwitch) 620, which provides a virtual switch 620 for VM or containerized environments. In accordance with an embodiment, the Virtualized RAN and Core Processing 604 is implemented using VMs 624 executing in a Kernel-Based Virtual Machine, commonly referred to as KVM Virtualization. In another embodiment, the Virtualized RAN and Core Processing 604 is implemented using containers 622. As previously described, the essential difference being that the VMs 624 require a separate kernel instance or Guest Operating System 625 (which run on a Host OS), while containers 622 can execute from the same Host OS. In accordance with an example, virtual Digital Signal Processors (vDSP) 626 and virtual Baseband Units (vBBU) 628 are implemented as respective VMs 624 or containers 622. The VMs 624 or containers 622, vDSPs 626, vBBUs 628 and Applications 630 implement Virtual Network Function 632. The vDSPs 626, vBBUs 628, and Applications 630 implement L2-L7 processing for the SDN 200 (FIG. 3). A Virtual Network Function (VNF) 632 controls and coordinates the virtual hardware. The VNF 632 is similar to the VNF 424 in FIG. 4. In accordance with an embodiment, the VNF 632 translates configuration information 504 received from the SDN Controller 502 (FIG. 5). The VNF 632 also translates state of health/performance monitoring information to a Network Management Application Program Interface (API) 526 in the SDN ground station 204 (FIG. 5).

The L1 Baseband Processing 606 is performed in a L1 PHY virtual module 634 (e.g., vBBU), which implements a number of L1 physical layer functions. These include an Ethernet NIC 636, which implements virtual MODEM functionality and communicates via the Ethernet protocol with the Spaceflight Ethernet NIC 610; Beam Forming Network (BFN) algorithms 638 which, for example, alter relative phases of a signal to implement beamforming via constructive and destructive interference; and forward and inverse Fast Fourier Transforms (IFFT/FFT) 640 to convert signals between time and frequency domains. A Digital Radio over Fiber (DRoF) or RF over Fiber (RFoF) SERial/DESerial (SERDES) 642 converts data to and from a serial format to DRoF or RFoF. In other implementations, the DRoF or RFoF SERDES 642 is replaced by a Common Public Radio Interface (CPRI) SERDES.

The Radio Front End Processing 608 includes a Digital Radio 644, a digital-to-analog converter (DAC) 646, an analog-to-digital converter (ADC) 648, an Analog Radio 650, and an Antenna Array 652. The Digital Radio 644 includes a DRoF or RFoF (CPRI) SERDES interface 654, and Digital Up Converter (DUC) 656 and Digital Down Converter (DDC) 658. In other implementations, the DRoF or RFoF SERDES 654 is replaced by a CPRI SERSES. The DUC 656 and DDC 658 provide frequency conversion between baseband and a carrier frequency (and an intermediate frequency in some embodiments). On the uplink side (left side of the Digital Radio 644), are a Crest Factor Reduction (CFR) unit 660 that operates to reduce the Peak to Average Power Ratio (PAPR) to increase transmitter power amplifier efficiency, and a Dynamic Pre-Distortion (DPD) 662 operative to reduce distortion in a transmitted signal by imposing distortion inverse to that caused by a transmission amplifier or Solid State Power Amplifier (SSPA) 664. A Joint Electronic Device Engineering Counsel Standard Document (JESD) SERDES 666 serializes transmit data for the DAC 646, and deserializes receive data from the ADC 648. The Analog Radio 650 includes a Duplexer 668 to isolate the transmit and receive channels, allowing the use of a single Antenna Array 652. Transmission signals 672 flow from the duplexer 668 through the Solid State Power Amplifier (SSPA) 664 to the Antenna Array 652. Received signals 674 flow from the Antenna Array 652 through a Low Noise Amplifier (LNA) 670 to the duplexer 668.

The Radio Front End Processing 608 and L1 Baseband Processing 606 functionality described above and the Ethernet NIC 636 implement what is known in the art as transparent payload functions. In some aspects, the transparent payload functions are provided in dedicated hardware, with the virtual MODEM functionality by Ethernet NIC 636 and Virtualized RAN and Core Processing 604 implemented in virtualized hardware. In other aspects, the MODEM functionality can additionally be implemented in dedicated hardware. In still other aspects, as depicted in FIG. 6, all of the functions can be virtualized, with only the analog components (antenna array 652, analog radio 650, DAC 646 and ADC 648) in hardware. This flexibility in choosing which subset of functionality to implement in hardware, and which in virtual machines (VMs) 624 or containers using common compute, memory, and switching resources, is a significant advantage of the approach of the present disclosure. As one example, the scope of functionality implemented in virtual hardware can increase over successive generations of a design, or as successive SDSs 202 are launched and added to the SDN 200. This approach allows the SDN 200 designer to take advantages of the latest state of the art in computing resources, as more functionality can be implemented in virtual machines (VMs) 624 or containers as the underlying computational resources in the SDS 202 payload continue to evolve and provide increased performance, lower weight, and lower power consumption.

Although FIG. 6 depicts an SDN 200 implementing 4G/5G mobile cellular functionality, the SDS 202 is standard agnostic, and indeed is waveform agnostic. The virtual resources dedicated to signal processing (i.e., vDSPs 626) can be reprogrammed to process any type of signals, conforming to any standard or proprietary specifications. The components of the exemplary SDS 202 in FIG. 6 described above are referred to as the satellite payload 676.

FIG. 7 depicts examples of service overlays 700 for representative access networks and core networks that can be implemented using the network architecture of FIG. 3. The service overlays 700 can be uploaded to the SDSs 202, to implement different types of telecommunication services. Access network service overlays 702 are implemented on vDSPs 626 and vBBUs 628 on an SDS 202 under the control of the SDN Controller 502. Representative access network service overlays include cellular Mobile Radio Access Networks (RANs) 704, Direct To Home (DTH) RANs 706, Wi-Fi RANs 708, Internet of Things (IoT) RANs 710, and US Government Services RANs 712. Examples of Mobile RAN 704 service overlays include but are not limited to 2G (GSM Base Station) 714; 3G Node-B (NB) 716; 4G enhanced Node-B (eNB) 718; and 5G gigabit Node-B (gNB) 720. Examples of Wi-Fi RAN 708 service overlays include but are not limited to Wi-Fi Radios 722 and Worldwide Interoperability for Microwave Access (WiMAX) Radios 724. Examples of Direct To Home (DTH) Video delivery service RAN 706 service overlays include but are not limited to Digital Video Broadcast-Satellite (DVB-S) Hub 726, Digital Video Broadcast-Satellite Second Generation (DVB-S2) Hub 728, and Digital Video Broadcast-Satellite Second Generation Extended (DVB-S2X) Hub 730. Internet of Things (IoT), also known as Machine-to-Machine (M2M), RAN 710 service overlays include but are not limited to NarrowBand IoT (NB-IoT) 732 and LOng RAnge (LoRa) wide area network 734. Additionally, proprietary communication services can be provided through Proprietary access network 736 service overlays, such as for United States Government (USG) Services 712.

Core network service overlays 738 are implemented on VMs 624 or containers (FIG. 6) on an SDS 202 under the control of the SDN Controller 502 (FIG. 5). Representative core network service overlays 738 correspond to the access network service overlays 702. Examples of cellular mobile core network overlays 740 include but are not limited to GSM Core Network 742; Universal Mobile Telecommunications System (UMTS) Core Network (CN) 744; 4G Evolved Packet Core (EPC) 746; and 5G Giga Packet Core (GPC) 748. Examples of Internet Protocol (IP) Core service overlays 750 include but are not limited to Switched Ethernet 752 and Routed IP functions 754. Additionally, proprietary communication services can be provided through Proprietary core network service overlays 756, such as for United States Government (USG) Services 758.

Although described herein with respect to an SDN 200, those of skill in the art will readily recognize that aspects of the present disclosure are not limited to telecommunications. Rather, the software defined satellite approach is applicable to imaging applications (visible light, thermal, multispectral, and the like), as well as sensor processing. In both cases, fundamental sensors (referred to herein as physical layer sensors), such as imaging sensor arrays or detectors such as x-ray or gamma ray detectors, can be implemented in hardware. Some or all higher layer processing can then be performed on virtual hardware, such as vDSPs 626, that emulates special-purpose hardware optimized to process the image, sensor data, or communications data. Similar advantages to those described above for telecommunications accrue in these applications—e.g., multiple different services, incremental deployment, evolution flexibility, dynamic reprogramming, and the like.

In general, an SDS 202 includes a payload comprising circuits implementing physical layer telecommunications, imaging, or sensor processing functions. The SDS 202 further includes computing resources 406 (FIG. 4) including processing circuitry, memory, and switching circuitry. The computing resources 406 implement virtualization technology to provide one or more of virtual machines (VM) 624 or containers 622, virtual Digital Signal Processors (vDSP) 626, and virtual Baseband units (vBBU) 628. The VMs 624 or containers 622, vDSPs 626, and vBBUs 628 are dynamically configured to implement higher layer telecommunications, imaging, or sensor processing functions. This provides a flexible platform for selective function implementation, the ability to implement multiple service types at once, the option of incremental deployment, flexibility in technology evolution, and dynamic reprogramming capability.

In the SDS 202, a VM 624 or container 622 functions as a configuration control computer 422 and is operative to configure the computing resources into VMs 624 or containers 622, vDSPs 626, or vBBUs 628, and to allocate service overlays 700 to each, in response to configuration commands received from a ground-based Software Defined Network (SDN) Controller 502. This provides a consistent interface between the SDN Controller 502 and each SDS 202.

In an SDS 202, VMs 624 or containers 622 are configured to implement one or more core network service overlays 738 and vDSPs 626 and vBBUs 628 are configured to implement corresponding access network service overlays 702. In particular, the vDSPs 626 are configured to process RF waveforms, and perform additional functions including anti-jamming and nulling, interference cancellation and cognitive radio algorithms. The vBBUs 628 are configured to implement modem functions (e.g. radio link control, radio resource management, simulated annealing algorithms for cognitive radio, etc.). This matches the virtualized hardware to the computational task assigned to it.

In an SDS, the configuration control computer, in response to commands received from the SDN Controller, is adapted to configure two or more core network service types and corresponding access network service types on the SDSs. This provides the flexibility of simultaneously operating two or more different network types.

In an SDS, the configuration control computer, in response to commands received from the SDN Controller, is adapted to dynamically re-configure one or more core or access networks on the SDSs to implement a different network service type. This allows for technological evolution, such as implementing new network standards as they are adopted or become widely deployed.

In an SDS, the configuration control computer, in response to commands received from the SDN Controller, is adapted to dynamically re-configure the parameters of one or more core or access networks on one or more SDSs. This provides frequency agility and the ability to optimize communication quality by avoiding interference or jamming, as well as the ability to implement cognitive radio by finding unused spectrum in which to operate.

In general, a Software Defined Network (SDN) Ground Station, includes a System Resource Manager adapted to control and manage the implementation of a telecommunications, imaging, or sensor processing system across a plurality of Software Defined Satellites (SDS); and a SDN Controller adapted to control and manage the configuration of computing resources on each SDS, the computing resources including processing circuitry, memory, and switching circuitry, the computing resources implementing virtualization technology to provide one or more of virtual machines (VM) or containers, virtual Digital Signal Processors (vDSP), and virtual Baseband Processing units (vBBU), and wherein the SDN Controller is further adapted to implement upper layer telecommunications, imaging, or sensor processing functionality on the virtualized resource on each SDS, in response to the System Resource Manager. This provides an organized system of network configuration and control, as well as a consistent interface between the ground and each SDS.

In one SDN Ground Station, the System Resource Manager implements resource management and optimization algorithms used to efficiently allocate resources being used by the network; and the SDN Controller is adapted to implement core network functionality on VMs or containers, and access network functionality on vDSPs and vBBUs. In particular, the SDN Controller is adapted to configure vDSPs to perform waveform manipulation, and to configure vBBUs to implement modem functions. This matches the virtualized hardware to the computational task assigned to it.

In one SDN Ground Station, the SDN Controller is adapted to configure two or more core network service types and corresponding access network service types on one or more SDSs. This provides the flexibility of simultaneously operating two or more different network types.

In one SDN Ground Station, the SDN Controller is adapted to dynamically re-configure one or more core or access networks on one or more SDSs to implement a different network service type. This allows for technological evolution, such as implementing new network standards as they are adopted or become widely deployed.

In one SDN Ground Station, the SDN Controller is adapted to dynamically re-configure the parameters of one or more core or access networks on one or more SDSs. This provides frequency agility and the ability to optimize communication quality by avoiding interference or jamming, as well as the ability to implement cognitive radio by finding unused spectrum in which to operate.

Figure 8:
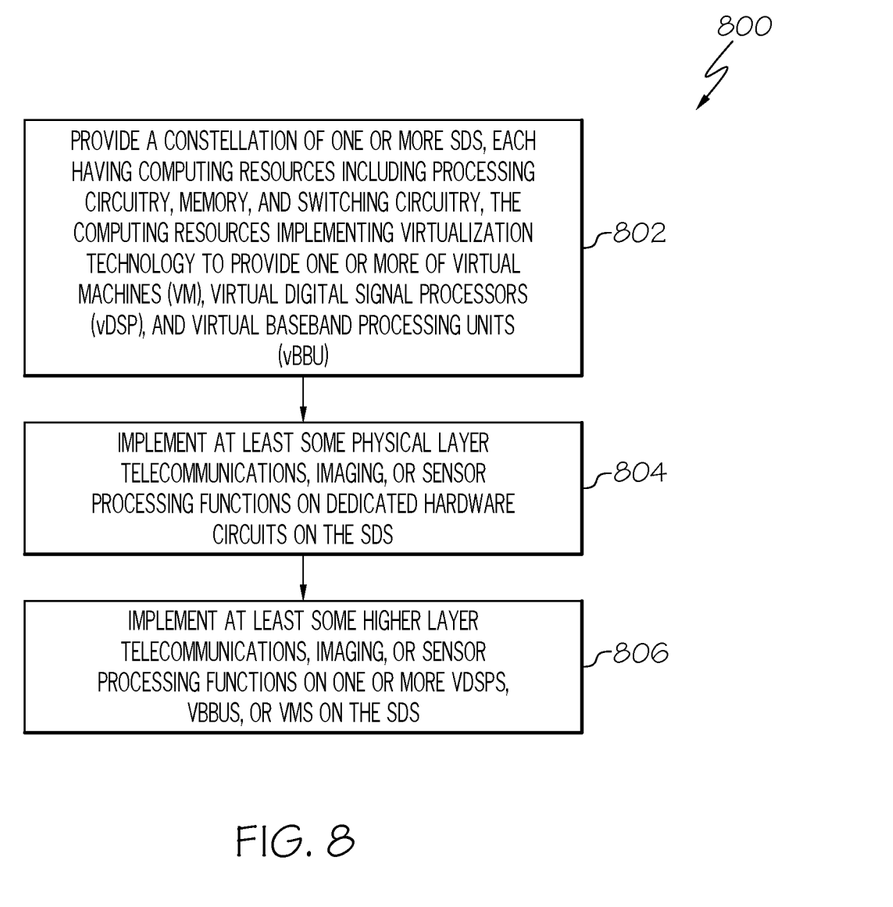
FIG. 8 is a flow chart of an example of a method for providing Software defined Satellite-based services.

FIG. 8 is a flow chart of an example of a method 800 for providing software defined satellite-based services. A constellation of one or more software defined satellites (SDS) 202 is provided (block 802). Each SDS 202 has computing resources 406 (FIG. 4) including processing circuitry, memory, and switching circuitry. The computing resources 406 implement virtualization technology to provide one or more of virtual machines (VM) or containers, virtual Digital Signal Processors (vDSP), and virtual Baseband Processing units (vBBU). At least some physical layer telecommunications, imaging, or sensor processing functions are implemented on dedicated hardware circuits on the SDS (block 804). At least some higher layer telecommunications, imaging, or sensor processing functions are implemented on one or more vDSPs, vBBUs, or VMs on the SDS (block 806).

In one such method, implementing at least some higher layer telecommunications, imaging, or sensor processing functions on one or more vDSPs, vBBUs, or VMs/containers on an SDS comprises configuring a VM/container on the SDS as a configuration control computer; and controlling the configuration control computer on each SDS, by a ground-based Software Defined Network (SDN) Controller, to configure the vDSPs, vBBUs, or VMs and to load service overlays onto the vDSPs, vBBUs, or VMs/containers. This provides an organized system of network configuration and control, as well as a consistent interface between the ground and each SDS.

In one such method, the SDS implements a telecommunication network, and loading service overlays onto the vDSPs, vBBUs, or VMs/containers comprises loading core network service overlays on VMs/containers and loading access network service overlays on vDSPs and vBBUs. In particular, vDSPs are configured to perform waveform manipulation, and vBBUs are configured to implement modem functions. This matches the virtualized hardware to the computational task assigned to it.

In one such method, two or more core network service types and corresponding access network service types are configured on one or more SDSs. This provides the flexibility of simultaneously operating two or more different network types.

In one such method, one or more core or access networks are dynamically re-configuring on one or more SDSs to implement a different network service type. This allows for technological evolution, such as implementing new network standards as they are adopted or become widely deployed.

In one such method, the parameters of one or more core or access networks are dynamically re-configured on one or more SDSs. This provides frequency agility and the ability to optimize communication quality by avoiding interference or jamming, as well as the ability to implement cognitive radio by finding unused spectrum in which to operate.

Aspects of the present disclosure present numerous advantages over the prior art. Satellite payloads are notoriously conservative, due to the very high cost of launch and near impossibility of upgrade or repair. Consequently, the latest technology is rarely utilized, limiting the satellite's performance. By implementing telecommunications, imaging, or sensor processing functions on virtual machines created by virtualization software executing on a common set of computing resources, the very latest innovations can be incorporated, avoiding obsolesce and maximizing the satellite's usefulness. Additionally, virtualization provides functionality not possible in dedicated hardware payloads, such as cognitive radio and mission redefinition (e.g., by switching a telecommunication satellite from one communication protocol to different one, which would normally require different hardware). In the telecommunications context, both core network and access network nodes can be implemented on the same SDS, eliminating the very large amount of communications between them from the air interface, which improves data rates, reduces latency, reduces interference on the air interface, and reduces power consumption.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A software defined network, comprising:
   a constellation of software defined satellites, wherein each software defined satellite comprises computing resources that are dynamically configurable to provide at least one of a plurality of different types of services, wherein the computing resources comprise virtualized hardware to provide one or more virtual machines (VMs) or containers, one or more virtual digital signal processors (vDSPs), and one or more virtual baseband units (vBBUs), wherein the VMs or containers, vDPSs and vBBUs are dynamically configured to provide the at least one of the plurality of different types of services; and
   wherein each software defined satellite further comprises an interface that interfaces with a software defined network ground station.

2. The software defined network of claim 1, wherein the plurality of different types of services comprise communications, imaging, sensor processing, space-based RADAR, and environmental monitoring, wherein communications comprise telecommunications, Internet-of-Things (IoT), Vehicle-to-Vehicle or Vehicle-to-Infrastructure (V2X).

3. The software defined network of claim 1, wherein one of the VMs or containers functions as a configuration control computer to configure the computing resources into the VMs or containers, vDSPs, and vBBUs, and to allocate a service overlay to each, in response to configuration information received from a ground-based software defined network (SDN) controller.

4. The software defined network of claim 3, wherein the one or more VMs or containers are configured to implement one or more core network nodes and the one or more vDSPs and vBBUs are configured to implement corresponding access network nodes.

5. The software defined network of claim 4, wherein the vDSPs are configured to process RF waveforms and perform additional functions including anti-jamming and nulling, interference cancellation, and cognitive radio algorithms, and the vBBUs are configured to implement modem functions.

6. The software defined network of claim 4, wherein the configuration control computer, in response to the configuration information received from the SDN controller, is adapted to dynamically configure two or more core network service types and corresponding access network service types on the software defined satellites.

7. The software defined network of claim 4, wherein the configuration control computer, in response to configuration information received from the SDN controller, is adapted to dynamically reconfigure at least one of the core network nodes and the access network nodes on the software defined satellites to implement a different network service type.

8. The software defined network of claim 4, wherein the configuration control computer, in response to configuration information received from the SDN controller, is adapted to dynamically reconfigure parameters of one or more core network nodes and access network nodes on one or more software defined satellites.

9. The software defined network of claim 1, wherein the software defined network ground station comprises:
a system resource manager configured to control and manage implementation of the plurality of different types of services across the constellation of software defined satellites; and
a software defined network (SDN) controller configured to control and manage the dynamic configuration of the computing resources on each software defined satellite.

10. A software defined satellite, comprising:
computing resources that are dynamically configurable to provide at least one of a plurality of different types of services in response to configuration information from a software defined network (SDN) controller, wherein the computing resources comprise virtualized hardware to provide one or more virtual machines (VMs) or containers, one or more virtual digital signal processors (vDSPs), and one or more virtual baseband units (vBBUs), wherein the VMs or containers, vDPSs and vBBUs are dynamically configured to provide the at least one of the plurality of different types of services; and
a phase array antenna that transmits and receives radio frequency (RF) signals from user equipment and a software defined network (SDN) ground station, wherein the SDN ground station comprises the SDN controller.

11. The software defined satellite of claim 10, wherein one of the VMs or containers functions as a configuration control computer to dynamically configure the computing resources into the VMs or containers, vDSPs, and vBBUs, and to allocate a service overlay to each, in response to the configuration information received from the SDN controller.

12. The software defined satellite of claim 11, wherein the one or more VMs are configured to implement one or more core network nodes and the one or more vDSPs and vBBUs are configured to implement corresponding access network nodes.

13. The software defined satellite of claim 12, wherein the configuration control computer, in response to configuration information received from the SDN controller, is adapted to dynamically reconfigure at least one of the core network nodes and the access network nodes on the software defined satellite to implement a different network service type.

14. A software defined network (SDN) ground station, comprising:
a processing circuitry;
a system resource manager configured to control and manage implementation of a plurality of different types of services across a constellation of software defined satellites; and
a software defined network (SDN) controller configured to control and manage dynamic configuration of computing resources on each software defined satellite, wherein the computing resources on each software defined satellite comprise virtualized hardware to provide one or more virtual machines (VMs) or containers, one or more virtual digital signal processors (vDSPs), and one or more virtual baseband units (vBBUs), wherein the VMs or containers, vDSPs and vBBUs are dynamically configured to provide at least one the plurality of different types of services in response to configuration information from the SDN controller.

15. The SDN ground station of claim 14, wherein one of the VMs or containers functions as a configuration control computer to dynamically reconfigure the computing resources into the VMs or containers, vDSPs, and vBBUs, and to allocate a service overlay to each, in response to the configuration information received from the SDN controller.

16. The SDN ground station of claim 14, wherein the one or more VMs or containers are dynamically configured to implement one or more core network nodes and the one or more vDSPs and vBBUs are configured to implement corresponding access network nodes and wherein at least one of the core network nodes and the access network nodes are dynamically reconfigured to implement a different network service type.

17. The SDN ground station of claim 14, further comprising an application programming interface handler that is an interface between the system resource manager and each software defined satellite.

18. The SDN ground station of claim 14, further comprising an operations manager, wherein the operations manager comprises:
an application programming interface handler that is an interface between the system resource manager and each software defined satellite;
a module configured to monitor a state of health and performance of a software defined network;
a service and configuration registry module;
a services orchestration module; and
a policy enforcement module.

19. The SDN ground station of claim 18, wherein the application programming interface handler provides payload configuration information from the system resource manager to a virtual function manager of each software defined satellite.

20. A method of providing satellite-based services, comprising:
providing a constellation of software defined satellites, wherein each software defined satellite comprises computing resources that are dynamically configurable to provide at least one of a plurality of different types of services, wherein the computing resources comprise virtualized hardware to provide one or more virtual machines (VMs) or containers, one or more virtual digital signal processors (vDSPs), and one or more virtual baseband units (vBBUs), wherein the VMs or containers, vDPSs and vBBUs are dynamically configured to provide the at least one of the plurality of different types of services; and
providing a software defined network (SDN) ground station that interfaces with the software defined satellites.

* * * * *